United States Patent [19]

Shaver et al.

[11] Patent Number: 5,044,959
[45] Date of Patent: Sep. 3, 1991

[54] METHOD FOR DIAGNOSING AND TREATING PSYCHOLOGICAL TRAUMA

[76] Inventors: Carol J. Shaver; Donna M. Purdy, both of 5102 Shell St., North Highlands, Calif. 95660

[21] Appl. No.: 511,794
[22] Filed: Apr. 20, 1990

Related U.S. Application Data

[63] Continuation-in-part of Ser. No. 319,969, Apr. 20, 1989, abandoned.

[51] Int. Cl.⁵ .............................................. G09B 19/00
[52] U.S. Cl. .................................... 434/236; 446/369; 446/76
[58] Field of Search ............... 434/236, 237, 238, 370; 446/369, 370, 372, 72, 75, 76

[56] References Cited

U.S. PATENT DOCUMENTS

| | | |
|---|---|---|
| 1,417,860 | 5/1922 | Reich . |
| 2,623,303 | 12/1952 | Mindel . |
| 4,341,521 | 7/1982 | Solomon ........................ 434/236 |
| 4,573,927 | 3/1986 | Newman . |
| 4,645,470 | 2/1987 | Benton . |
| 4,762,494 | 8/1988 | Woods ........................... 434/236 |
| 4,917,607 | 4/1990 | Van Hoose ..................... 434/236 |
| 4,931,934 | 6/1990 | Snyder .......................... 434/236 X |

FOREIGN PATENT DOCUMENTS

1268636 2/1961 France .

Primary Examiner—Richard J. Apley
Assistant Examiner—Rachel M. Healey
Attorney, Agent, or Firm—Thomas R. Lampe

[57] ABSTRACT

A representational figure having a receptacle therein is employed to diagnose and treat a psychological trauma in a child. In response to questions, the child selects a plurality of objects which are representative kof either the nature or intensity of emotional feelings and inserts them into the receptacle where they can be observed by the practitioner treating the child.

6 Claims, 8 Drawing Sheets

METHOD FOR DIAGNOSING AND TREATING PSYCHOLOGICAL TRAUMA

This is a continuation-in-part of U.S. patent application Ser. No. 07/319,969, filed Apr. 20, 1989, now abandoned.

TECHNICAL FIELD

The present invention relates to a method and apparatus for diagnosing and treating the effects of psychological trauma experienced by a child. The apparatus of the invention is employed as a projective assessment tool to assist the practitioner treating the child in evaluating the nature and extent of the trauma. Further, the apparatus is incorporated as part of the treatment process. The method of the present invention comprises a series of steps followed by the practitioner when utilizing the apparatus.

BACKGROUND ART

The use of representational figures, such as human dolls, stuffed animals, and the like, as tools for communicating with children, and in particular as vehicles through which the child can express his or her feelings is known.

For example, U.S. Pat. No. 4,573,927, issued Mar. 4, 1986 discloses a doll which is to be employed in therapeutic settings when working with children who are experiencing emotional and/or learning problems. The doll-like figure of U.S. Pat. No. 4,573,927 includes four facial panels which the child can attach to the rest of the figure to express a feeling which he or she may not be able to, or wish to, readily verbalize.

U.S. Pat. No. 4,645,470, issued Feb. 24, 1987, relates to a doll particularly developed for the entertainment of children, the doll having a receptacle formed as a part thereof. The child creates written communications which are then inserted into the receptacle and thus entrusted to the custody and care of the doll.

Of course, a wide variety of stuffed animals exist in the prior art, including animals which essentially operate as hand puppets whereby a child can manipulate the puppet-like figures for both entertainment and other purposes. Representative of such devices are those shown in French Patent No. 1,268,636, issued to Lang, and U.S. Pat. No. 1,417,860, issued May 30, 1922 to Reich.

As will be seen below, the apparatus of the present invention differs significantly from the structure disclosed in the aforesaid patents. One difference is incorporation in the representational figure of the present invention of a receptacle into which one or more objects may be placed by a child as part of the overall method of this invention. U.S. Pat. No. 2,623,303, issued Dec. 30, 1952, discloses an educational toy wherein a plurality of different shaped objects are inserted into a box-like receptacle having different apertures corresponding to the different geometrical pieces or blocks manipulated by the child.

DISCLOSURE OF THE INVENTION

The apparatus of the present invention includes a representational figure, such as a teddy bear, having a first side and a second side generally opposed to the first side. The representational figure is manually compressible upon application of forces to the first and second sides.

A receptacle extends through the representational figure between the first and second sides thereof, the receptacle including a face plate located at the representational figure first side and defining an aperture for receiving at least one object. A receptacle body is attached to the face plate and defines an interior disposed within the representational figure for receiving said at least one object. The receptacle body is collapsible upon application of the forces to the representational figure first and second sides.

The receptacle additionally includes a rear plate operatively associated with the receptacle body for selectively opening or closing the receptacle body. The rear plate is located at the second side of the representational figure and allows manual access to the receptacle body interior from the second side when opened.

The face plate and rear plate are transparent whereby the interior of the receptacle body and the object or objects therein may be observed from either of the first and second sides of the representational figure.

The objects employed when practicing the teachings of the present invention are each distinctive in appearance from all of the other of said objects, and the appearance of each object is representative of the nature or intensity of emotional feelings.

According to the method of the present invention, the child is given the representational figure. The child is also presented with a plurality of said objects.

The child is instructed to select from the plurality of objects at least one object which most corresponds to the emotion being felt by the child and to place said at least one object in the receptacle. The object or objects in the receptacle are observed and such observation may be had from either the first side or the second side of the representational figure.

A preferred embodiment of the representational figure is that of a teddy bear, although other forms of non-threatening representational figures may be employed. In any event, the representational figure, during the course of the diagnostic session, will likely be squeezed and cuddled by the child. In order that this activity will not be impeded or discouraged, the receptacle body wall is collapsible upon application of outside forces to the representational figure.

Other features, advantages and objects of the present invention will become apparent with reference to the following detailed description and accompanying drawings.

BEST MODE FOR CARRYING OUT THE INVENTION

Figure 1:
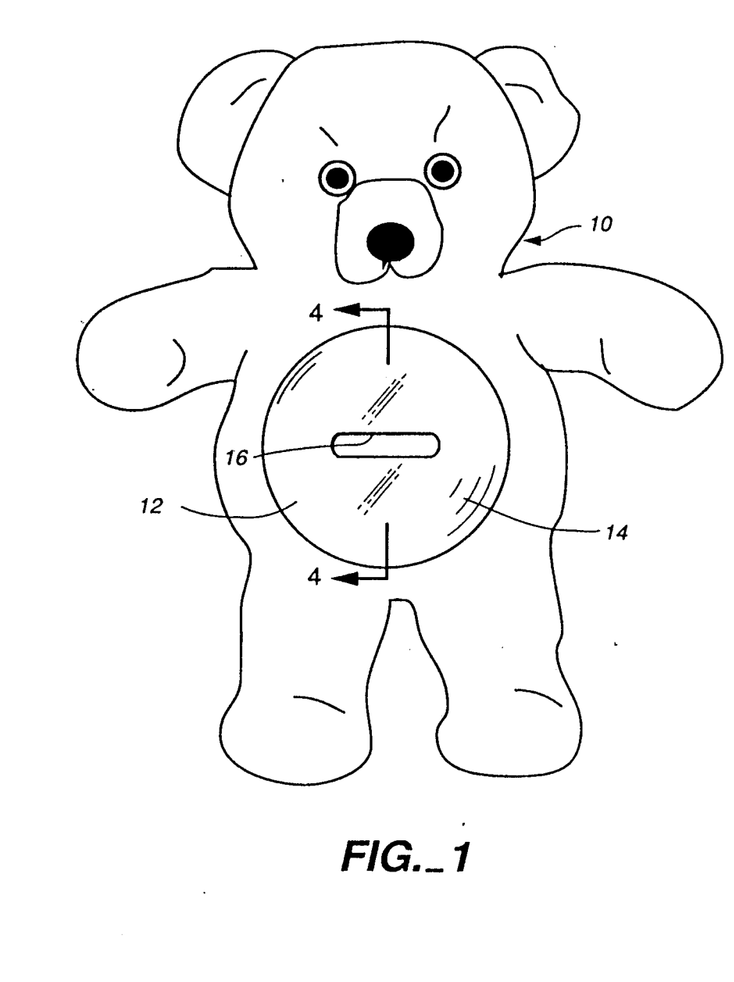
FIG. 1 is a front elevation view of a preferred form of apparatus constructed in accordance with the present invention.
Figure 2:
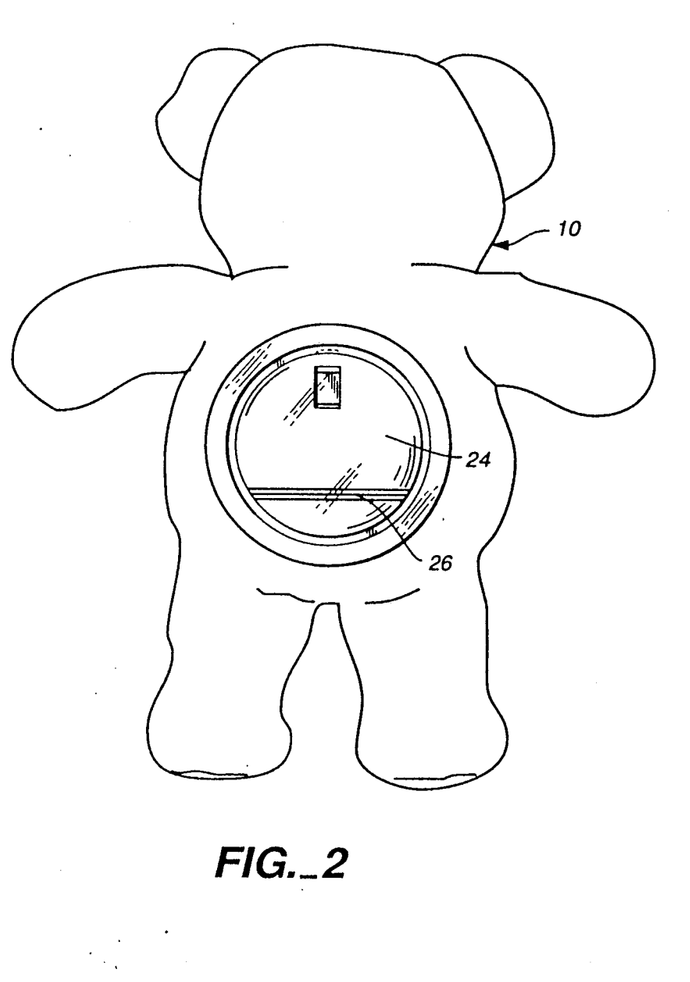
FIG. 2 is a rear elevation view of the apparatus.
Figure 3:
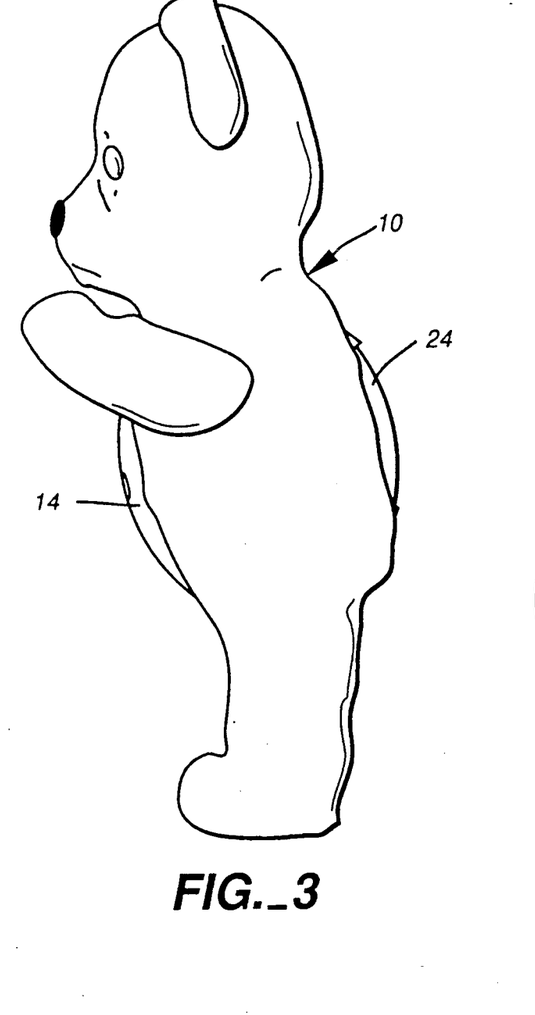
FIG. 3 is a side elevation view of the apparatus.

Referring now to the drawings, a representational FIG. 10 is shown. The representational FIG. 10 is in the form of a stuffed animal, and even more particularly, in the form of a teddy bear. When practicing the present invention, it has been found that a teddy bear is an extremely non-threatening vehicle for a child to relate to in order to express his or her feelings and emotions. Then too, a teddy bear is identified by the child as a normal play toy and, as such, likely to encourage the free flow of information between the child and the person practicing the method of the present invention which will be described in detail below. Many psychological evaluation devices employed in the prior art are unfamiliar, even foreign, to a young child and restrict such free flow of information.

Further, a teddy bear engenders feelings of comfort in a young child which significantly reduces the stress of post-trauma psychological treatment. The teddy bear itself is, for the most part, of conventional construction, being stuffed with a soft, compressible material and having an outer surface of plush or other soft material. When the teddy bear is hugged or cuddled, a certain amount of compression of the figure will take place.

Figure 4:
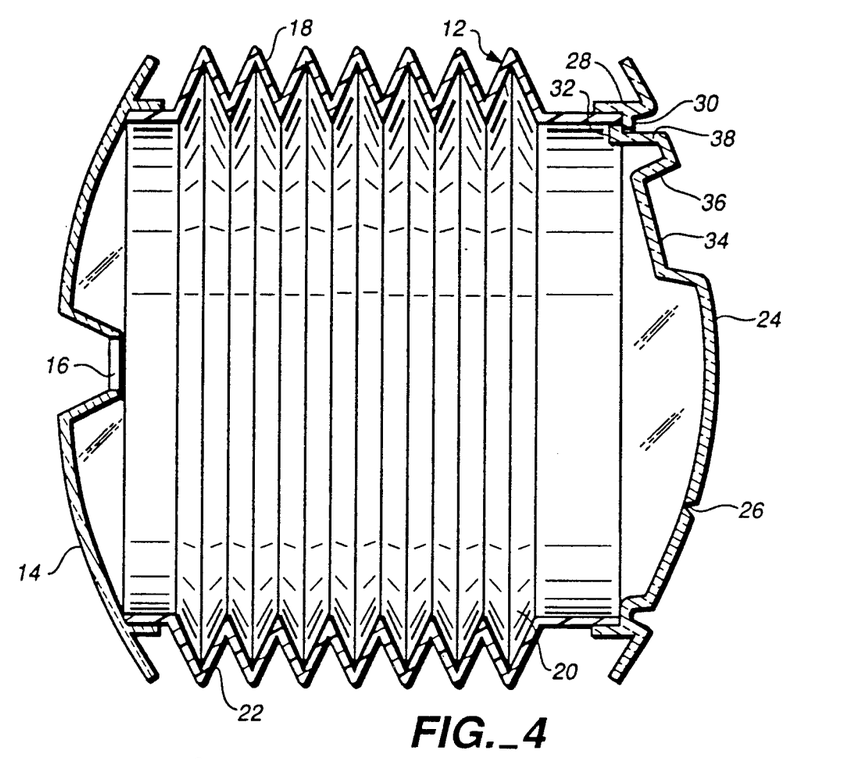
FIG. 4 is an enlarged, cross-sectional view taken along the line 4—4 of FIG. 1 and illustrating the receptacle.

A receptacle 12 extends through representational figure 10 between the first and second sides thereof, that is, in the disclosed embodiment, between the front of the teddy bear and the 10 rear thereof. The receptacle extends from the abdomen of the teddy bear to the back of the teddy bear.

Figure 7:
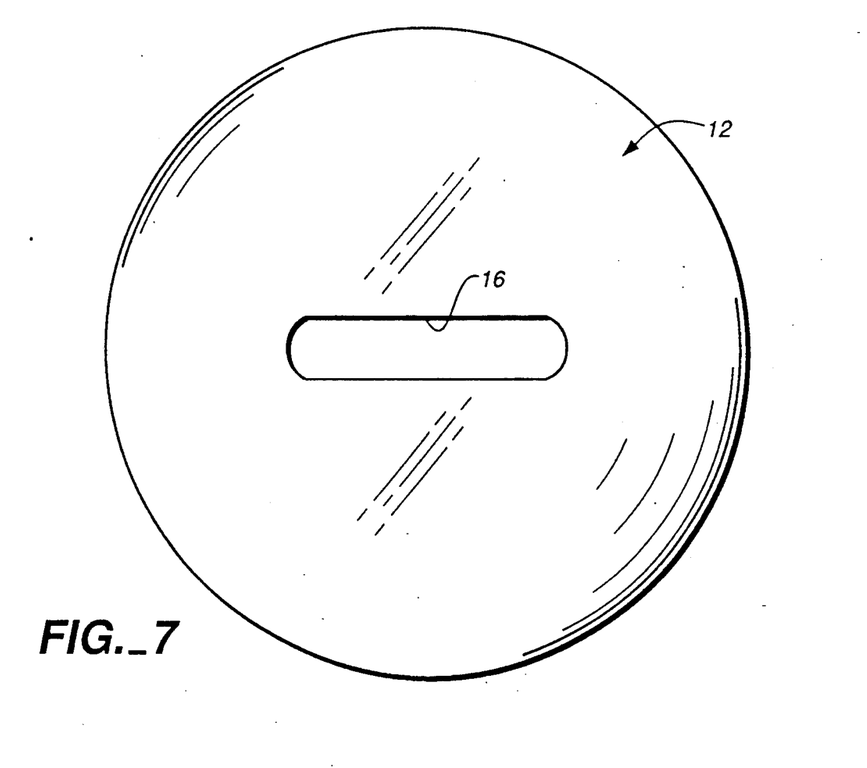
FIG. 7 is an enlarged, frontal elevation view of a face plate of the apparatus.

The receptacle 12 includes a face plate 14 which defines an aperture in the form of a slot 16. The face plate 14 is constructed of any suitable material, such as plastic, and is transparent.

Face plate 14 is attached to a receptacle body 18 by any suitable expedient. The receptacle body 18 defines an interior 20 and is disposed within representational FIG. 10.

With particular reference to FIG. 4, it may be seen that the receptacle body 18 includes a cylindrically-shaped pleated wall 22. The pleats of the pleated wall readily flex and collapse when endwise compressive forces are exerted thereon. It will be appreciated that such forces are likely to occur when the teddy bear or other representational figure employed is compressed when being hugged or cuddled. Thus, the receptacle will not impede or deter such activity. This is important since it contributes to the overall effect of the representational FIG. 10 being a normal teddy bear of the type familiar to most children and utilized in conventional play activities.

The receptacle 12 additionally includes a rear plate 24 which is transparent and may be constructed of any suitable material, such as plastic. It will be appreciated that interior 20 of receptacle body 18, as well as any contents thereof, may be observed through either face plate 14 or rear plate 24.

Figure 5:
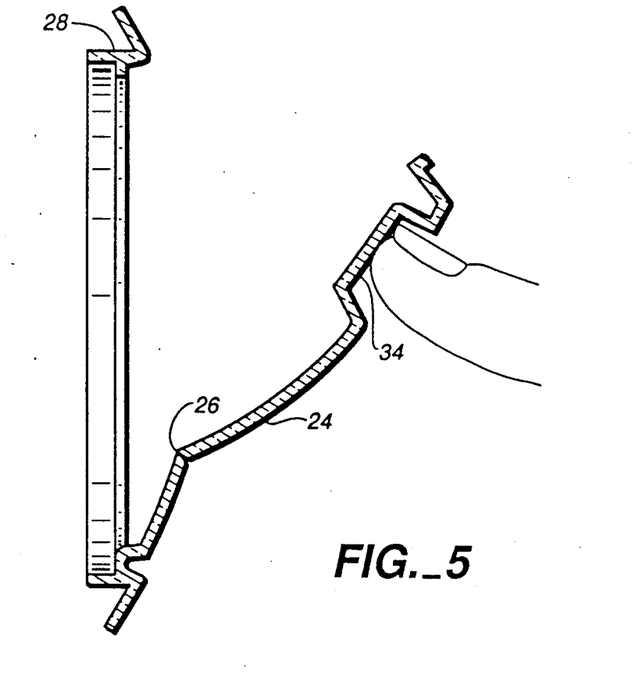
FIG. 5 is an enlarged, side view, in cross-section, illustrating an open receptacle rear plate.
Figure 6:
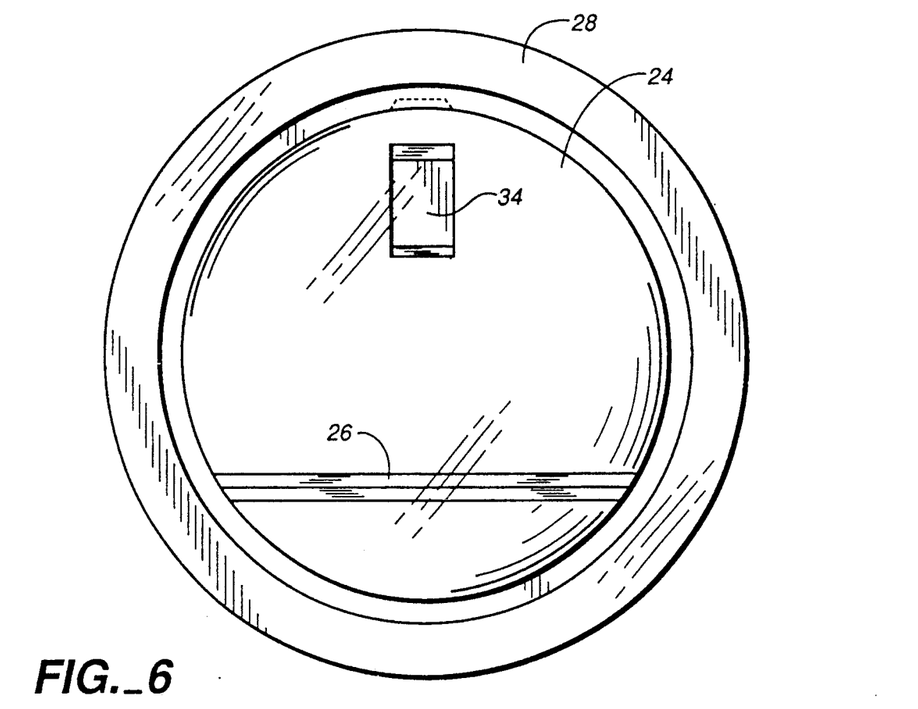
FIG. 6 is a frontal elevational view of the rear plate in closed condition.

Rear plate 24 may be selectively manually opened or closed whereby manual access may be had to the receptacle body interior from the representational figure second side, i.e. from the rear of the teddy bear. An integral hinge 26 hingedly connects rear plate 24 to a collar 28 affixed to pleated wall 22 by any suitable fashion, such as by being press fit with respect thereto or adhesively secured thereto. Collar 28 includes a retention element 30 which projects inwardly and is adapted to be engaged by a lip 32 comprising part of the rear plate 24. A recess 34 is formed in rear plate 24 and, as shown in FIG. 5, accommodates a finger which may be utilized to push the rear plate into closed position. To open the rear plate, the user can pinch together wall 36 partially defining the recess and an opposing wall 38 from which the lip 32 projects.

When working with a child, the practitioner should first allow the child to get familiar with the bear or other representational figure selected and feel safe with it. The child should be allowed to cuddle the figure, give it a name, and generally get comfortable with it.

Once the child is comfortable with the figure, the practitioner can begin to ask about the trauma the child experienced. For example, the child may have been a victim of physical or sexual abuse, been in a serious accident, or have witnessed some traumatic event.

The child is presented with a plurality of objects, each of the objects being distinctive in appearance from all of the other of the objects, and the appearance of each object representative of the nature or intensity of emotional feelings.

In the illustrated preferred embodiment of the present invention, the objects comprise a series of sets of disks, with the sets being presented to the child seriatim.

FIGS. 9a–9j represent a first set of disks which may be employed. It will be seen that each disk of this set (with the exception of one) depicts a facial expression expressing a type of emotion. The set of disks 9a–9j running the gamut of such emotions. The practitioner asks the child to pick a face disk that best describes how he or she feels (or felt) about the traumatic event. The child should be given adequate time to thoroughly explore all the face disks. Once a face disk is selected, the child is asked to place the disk in the slot 16 so that it lodges in interior 20. If the child doesn't have any particular feelings, the plain disk might be selected. The practitioner may readily observe the nature of the disk selected since it can be observed through either face plate 14 or rear plate 24.

Next, the child is presented with a second set of disks, each of which has its own unique color. This second set of disks is shown in FIGS. 10a–10g. The child is asked to pick a color that describes how he or she feels (or felt) about the trauma. Again, the child should be allowed plenty of time to explore all of the colored disks until one is selected. The child then places that disk in the slot 16.

The next step of the process is designed to help the child describe the intensity of the feeling experienced. This step is carried out through the use of a third set of disks. FIGS. 11a–11j represent one alternative form of third set of disks and FIGS. 12a–12j represent another embodiment of the third set of disks. As can be seen, the disks of FIGS. 11a–11j have the numbers 1 through 10 printed on them, while the disks 12a through 12j have dots of varying sizes imprinted on them.

The set shown in FIGS. 12a-12j is recommended for young children and the set of disks shown in FIGS. 11a-11j is recommended for older children who understand numbers. The basic idea is to ask the child "how much" does he or she feel this feeling. The child then selects the disk that best describes the intensity of the feeling and places that disk in the slot 16.

At this stage, the practitioner can ask specific questions about what the face means, why the child selected the particular color, and the intensity of the feelings associated with the face and color.

Figure 8:
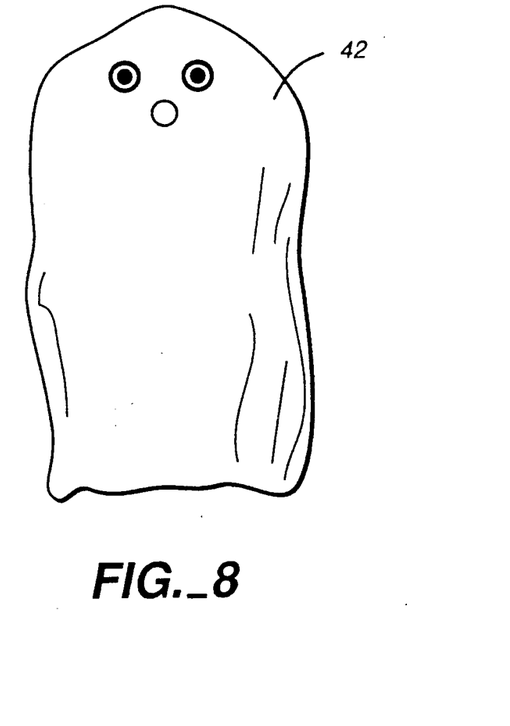
FIG. 8 is a frontal elevation view of a hand puppet which may be employed when practicing the method of the present invention.
Figures 9A, 9D:
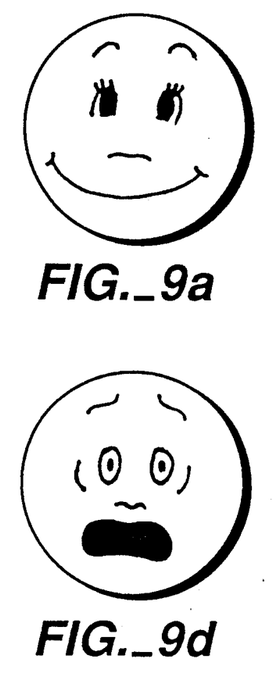
FIGS. 9a through 9j are enlarged, elevation views of a first set of disks employed to carry out the method of the present invention.
Figures 9B, 9E:
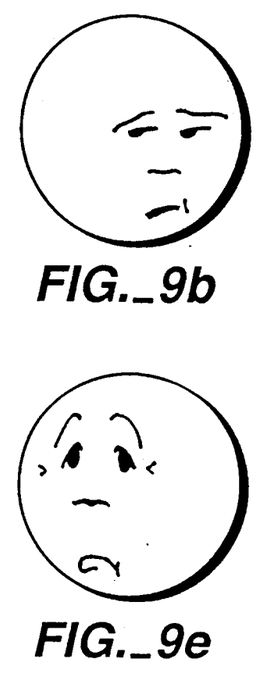
Figures 9C, 9F:
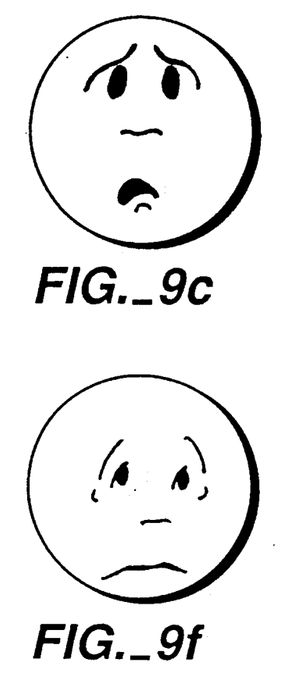
Figure 9G:
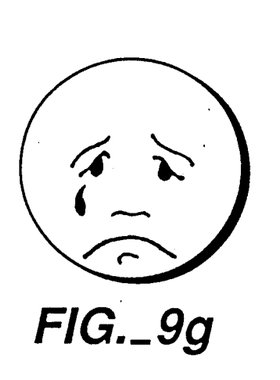
Figure 9H:
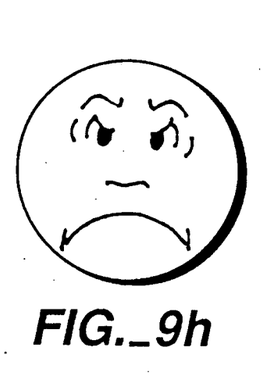
Figure 9I:
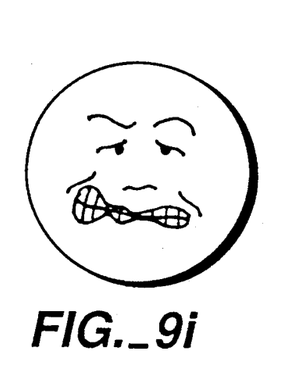
Figure 9J:
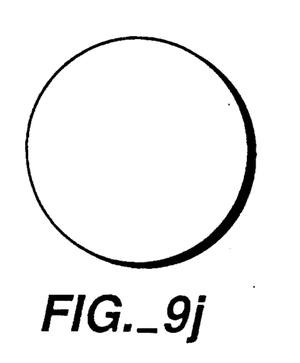
Figure 10A:
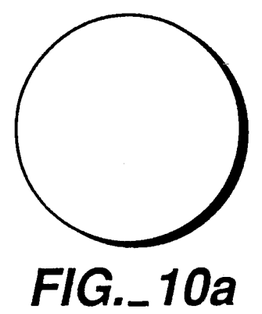
FIGS. 10a–10g are enlarged, elevation views of a second set of disks employed to carry out the method of the present invention.
Figure 10B:
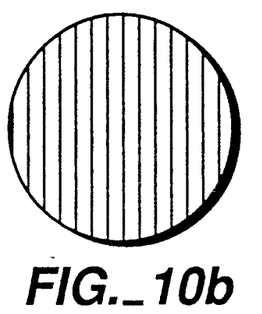
Figure 10C:
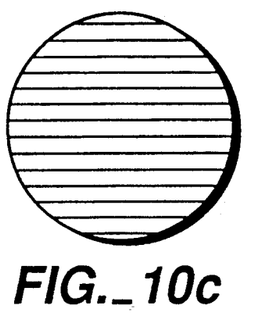
Figure 10D:
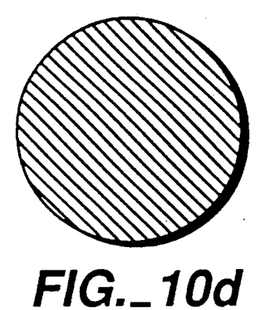
Figure 10E:
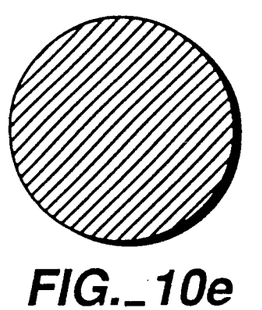
Figure 10F:
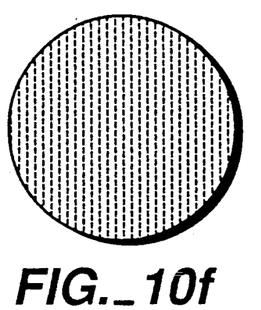
Figure 10G:
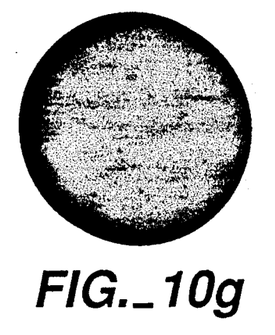
Figure 11A:
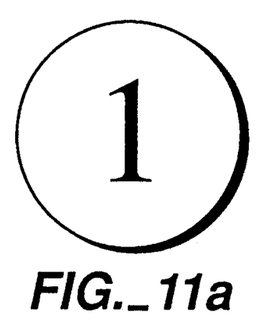
FIGS. 11a–11j illustrate a preferred embodiment of a third set of disks employed to carry out the method of the present invention.
Figure 11B:
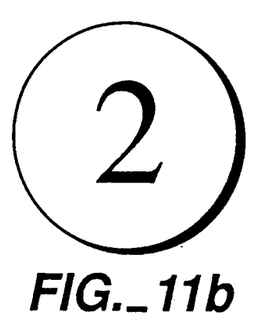
Figure 11C:
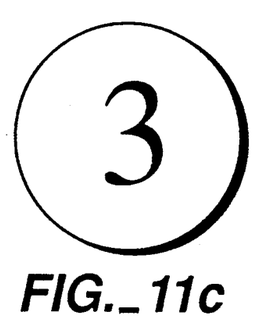
Figure 11D:
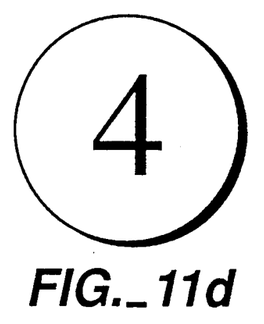
Figure 11E:
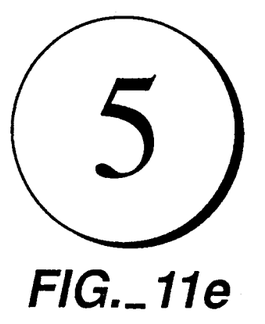
Figure 11F:
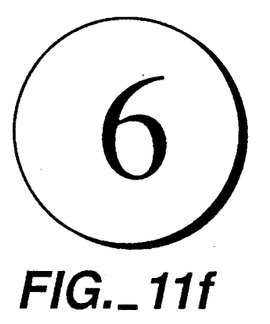
Figure 11G:
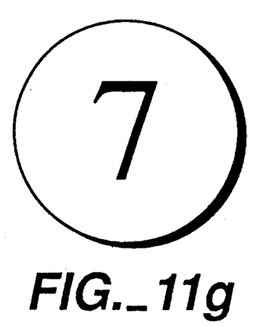
Figure 11H:
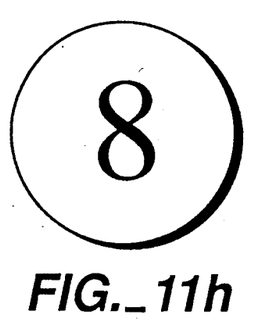
Figure 11I:
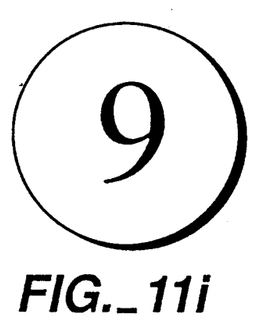
Figure 11J:
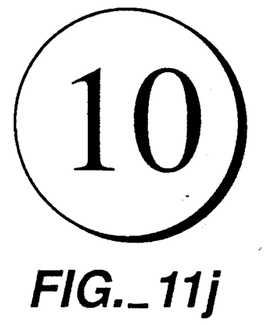
Figure 12A:
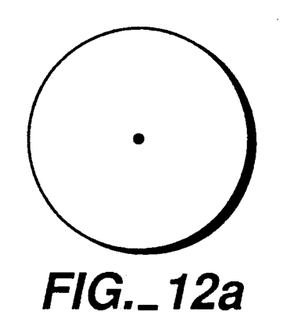
FIGS. 12a–12j are enlarged, elevation views of an alternative embodiment of the third set of disks which may be employed to carry out the teachings of the present invention.
Figure 12B:
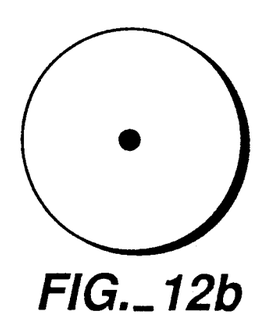
Figure 12C:
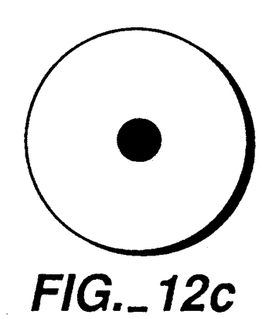
Figure 12D:
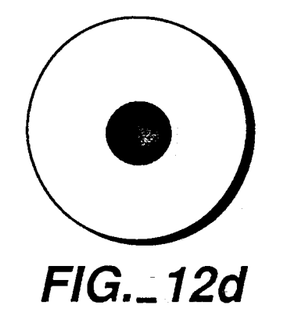
Figure 12E:
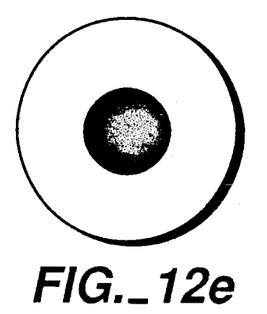
Figure 12F:
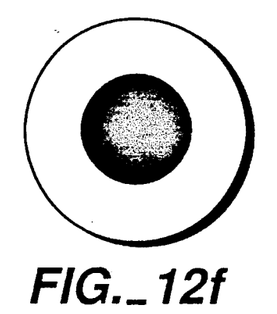
Figure 12G:
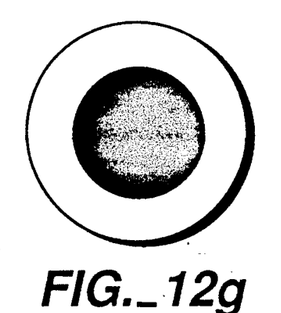
Figure 12H:
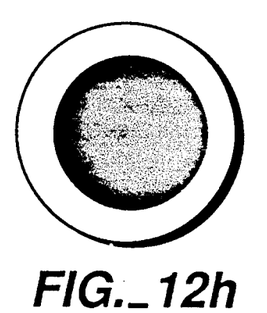
Figure 12I:
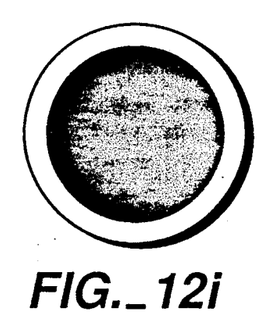
Figure 12J:
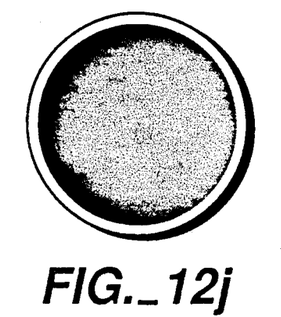

The practitioner has the option of asking the child to tell the bear about the experience rather than tell the practitioner directly. Often, children have an easier time talking to a bear or other suitable representational figure than to an adult, particularly if adults have been the cause of the trauma. A hand puppet such as puppet 42 shown in FIG. 8 may be used by the child to talk to the practitioner or to the representational figure. Alternatively, the practitioner may use the hand puppet to talk to the child.

It is important for the practitioner to ask the child what the disks mean to him or her rather than make assumptions. For instance, for one child the color red may represent anger, but for another child it may simply be a favorite color. One child may pick a yellow disk because it represents sunshine and warmth while another child may have fear associated with yellow because of involvement in a fire. The child should always be asked to describe what the colors, faces and numbers or intensity dots mean.

The following case studies are representative of how the apparatus and method of the present invention may be employed in the diagnosis and treatment of a child's psychological trauma.

Case #1

Susy was repeatedly molested by her father from the time she was an infant until the molests were discovered at age 5. She was introduced to the bear and chose to name him "Barney." After she had time to get comfortable with Barney, she was asked to pick a face disk that describes her feelings toward Daddy. She selected a sad face and put that face disk in the slot in Barney's face plate. Then Susy was asked to pick a color disk to describe her feelings about Daddy. She chose blue and put that disk into Barney. Next Susy was asked how much she felt sad and like the color blue relating to Daddy. She was told that "a little bit" was the small dot and "a whole bunch" was the big dot. She selected a dot slightly over medium sized and put the disk into Barney. The practitioner then asked Susy if she would like to meet another "helper" and introduced Susy to the hand puppet. Susy decided to name the puppet "Kermit" and became comfortable with how to use the puppet. The therapist then asked Susy if Barney would be willing to talk to Kermit about the disks and what they meant, which she proceeded to do.

Case #2

Billy is an 8-year-old boy who witnessed an abduction of a young neighbor boy, who is still missing. The neighbor boy, John, was a playmate and friend. The case was the subject of much publicity on the news and at school. Billy is very upset about the abduction and has nightmares almost every night. Billy was introduced to the bear and named him "Oscar." After Billy was comfortable with Oscar, he was asked to pick a face disk that showed how he felt. He picked a scared face and put it into Oscar. Then he was asked to pick a color disk that described his feelings, and placed a brown disk into Oscar. Next he was asked to pick a number disk that indicated how much he was scared and how brown he felt. He picked a "9" and put that disk into Oscar. The practitioner then asked Billy to talk about the face and the color brown. Billy indicated that he was very scared and he picked brown because he had brown hair and eyes just like his friend John. And he was afraid the man who took John would come back and get him too. Billy was able to talk fairly directly to the practitioner about his feeling but clutched Oscar very tightly during the talk. When the practitioner asked Billy if he felt safe anywhere, he said he felt safe with his Mom and Dad. When asked how he felt at home with his parents, he picked a happy face and a red disk. Billy's parents were invited to meet with the practitioner and Billy so he could describe to them what he was doing with Oscar. Together they established a procedure under which Billy could tell his parents when he was afraid and how they would all handle the problem together.

We claim:

1. A method for diagnosing and treating psychological trauma in a child, said method comprising the steps of:
   giving said child a representational figure having a first side and a second side, said second side generally opposed to said first side, said representational figure having a transparent receptacle extending between said first and second sides and defining an interior observable from either one of said first side and said second side;
   presenting said child with a plurality of objects, each of said objects being distinctive in appearance from all of the other of said objects, and the appearance of each object representative of the nature or intensity of emotional feelings;
   instructing said child to select from said plurality of objects at least one object which most corresponds to the emotion being felt by the child and to place said at least one object in the receptacle; and
   observing the at least one object in the receptacle through either of said first and second sides after placement thereof in the receptacle by the child.

2. The method according to claim 1 wherein said plurality of objects comprises a series of sets of said objects, said step of presenting said objects to said child comprising presenting said sets to said child seriatim.

3. The method according to claim 2 wherein each set following the first set is presented to the child only after the child has selected and placed in said receptacle at least one object from the preceding set presented to said child.

4. The method according to claim 3 wherein said child is first presented a first set of said objects which includes a plurality of objects bearing faces showing a range of emotions, is next presented with a second set of said objects which includes a plurality of objects of different colors, and is finally presented with a third set of said objects, each object of said third set bearing indicia representative of intensity of feeling.

5. The method according to claim 1 wherein said representational figure is a stuffed, simulated animal, said method including the additional step of allowing said child to play with said stuffed, simulated animal before the step of instructing said child to select at least one object.

6. The method according to claim 1 including the additional step of directing questions to said child before said child selects from said plurality of objects.

* * * * *